(12) United States Patent
Berkowitz et al.

(10) Patent No.: US 7,379,973 B2
(45) Date of Patent: May 27, 2008

(54) COMPUTER-IMPLEMENTED VOICE APPLICATION INDEXING WEB SITE

(75) Inventors: Stuart Berkowitz, Toronto (CA); Robert Marchand, King (CA)

(73) Assignee: Voicegenie Technologies, Inc., Toronto (CA)

( * ) Notice: Subject to any disclaimer, the term of this patent is extended or adjusted under 35 U.S.C. 154(b) by 750 days.

(21) Appl. No.: 09/759,926

(22) Filed: Jan. 12, 2001

(65) Prior Publication Data

US 2002/0095472 A1 Jul. 18, 2002

(51) Int. Cl.
*G06F 15/16* (2006.01)

(52) U.S. Cl. .................... 709/217; 709/201; 709/203

(58) Field of Classification Search ............... 709/201, 709/203, 217; 704/231, 256, 275
See application file for complete search history.

(56) References Cited

U.S. PATENT DOCUMENTS

| | | | |
|---|---|---|---|
| 4,520,576 A | | 6/1985 | Vander Molen |
| 5,749,072 A | | 5/1998 | Mazurkiewicz et al. |
| 5,822,012 A | | 10/1998 | Jeon et al. |
| 5,835,667 A | * | 11/1998 | Wactlar et al. ............... 386/96 |
| 5,838,665 A | | 11/1998 | Kahn et al. |
| 5,889,774 A | | 3/1999 | Mirashrafi et al. |
| 5,937,037 A | | 8/1999 | Kamel et al. |
| 5,999,612 A | | 12/1999 | Dunn et al. |
| 5,999,965 A | | 12/1999 | Kelly |
| 6,028,917 A | | 2/2000 | Creamer et al. |
| 6,185,527 B1 | * | 2/2001 | Petkovic et al. ............ 704/231 |
| 6,223,210 B1 | * | 4/2001 | Hickey ........................ 709/203 |
| 6,226,361 B1 | | 5/2001 | Koyama |
| 6,240,405 B1 | * | 5/2001 | Suzuki .......................... 706/45 |
| 6,252,947 B1 | * | 6/2001 | Diamond et al. ......... 379/88.22 |
| 6,310,873 B1 | | 10/2001 | Rainis et al. |
| 6,324,519 B1 | | 11/2001 | Eldering |
| 6,337,858 B1 | | 1/2002 | Petty et al. |
| 6,397,181 B1 | * | 5/2002 | Li et al. ...................... 704/256 |
| 6,400,806 B1 | * | 6/2002 | Uppaluru ................. 379/88.02 |
| 6,460,057 B1 | * | 10/2002 | Butler et al. ............. 715/500.1 |
| 6,487,595 B1 | | 11/2002 | Turunen et al. |
| 6,490,564 B1 | * | 12/2002 | Dodrill et al. .............. 704/275 |

(Continued)

OTHER PUBLICATIONS

U.S. Appl. No. 09/759,829, filed Jan. 12, 2001 entitled "Audio Advertising Computer System and Method".

(Continued)

*Primary Examiner*—Jason D Cardone
*Assistant Examiner*—Thomas Duong
(74) *Attorney, Agent, or Firm*—Central Coast Patent Agency, Inc.

(57) ABSTRACT

A computer-implemented voice application indexing method and system for supplying voice applications that provide telephony services to users. The method and system include receiving voice application data over the network regarding the voice applications. The voice application data contains location data to indicate where the voice applications are located on the network. The voice application data are stored in a database in accordance with a predetermined voice application taxonomy. A request is received for a voice application based upon a user requesting a telephony service. The request includes search criteria for selecting a voice application from the database. The location data of at least one voice application (whose stored voice application information substantially satisfies the search criteria) is retrieved from the database. The voice application located at the retrieved location data is used to perform the user-requested telephony service.

30 Claims, 9 Drawing Sheets

U.S. PATENT DOCUMENTS

| | | |
|---|---|---|
| 6,542,499 B1 | 4/2003 | Murphy et al. |
| 6,578,000 B1 * | 6/2003 | Dodrill et al. ............... 704/270 |
| 6,597,687 B1 | 7/2003 | Rao |
| 6,600,736 B1 | 7/2003 | Ball et al. |
| 6,615,173 B1 | 9/2003 | Celi, Jr. |
| 6,643,622 B2 * | 11/2003 | Stuart et al. ................. 704/275 |
| 6,654,722 B1 | 11/2003 | Aldous et al. |
| 6,665,658 B1 * | 12/2003 | DaCosta et al. ............... 707/3 |
| 6,674,745 B1 | 1/2004 | Schuster et al. |
| 6,697,964 B1 * | 2/2004 | Dodrill et al. ................ 714/38 |
| 6,700,884 B2 | 3/2004 | Emerson, III |
| 6,704,305 B2 | 3/2004 | Emerson, III |
| 6,704,708 B1 * | 3/2004 | Pickering .................... 704/235 |
| 6,707,811 B2 * | 3/2004 | Greenberg et al. .......... 370/352 |
| 6,711,618 B1 * | 3/2004 | Danner et al. ............... 709/228 |
| 6,714,535 B1 | 3/2004 | Herh |
| 6,717,593 B1 * | 4/2004 | Jennings ..................... 715/760 |
| 6,721,705 B2 | 4/2004 | Kurganov et al. |
| 6,738,803 B1 * | 5/2004 | Dodrill et al. ............... 709/218 |
| 6,760,343 B1 | 7/2004 | Krishnamurthy et al. |
| 6,766,298 B1 * | 7/2004 | Dodrill. ............ 704/270.1 |
| 6,779,154 B1 * | 8/2004 | Nussbaum et al. ......... 715/523 |
| 6,847,999 B1 * | 1/2005 | Dodrill et al. ............... 709/225 |
| 6,883,015 B1 * | 4/2005 | Geen et al. .................. 709/203 |
| 6,901,431 B1 * | 5/2005 | Dodrill et al. ............... 709/207 |
| 6,907,455 B1 * | 6/2005 | Wolfe et al. ................. 709/217 |
| 6,952,800 B1 * | 10/2005 | Danner et al. ............... 715/513 |
| 7,209,942 B1 * | 4/2007 | Hori et al. ................... 709/203 |
| 2002/0006124 A1 * | 1/2002 | Jimenez et al. ............. 370/352 |
| 2002/0169866 A1 * | 11/2002 | Lim et al. .................... 709/223 |

OTHER PUBLICATIONS

U.S. Appl. No. 09/759,931, filed Jan. 12, 2001 entitled "Computer-Implemented Voice Markup Language-Based Server".

U.S. Appl. No. 09/760,028, filed Jan. 12, 2001 entitled "Home-Based Client-Side Media Computer".

* cited by examiner

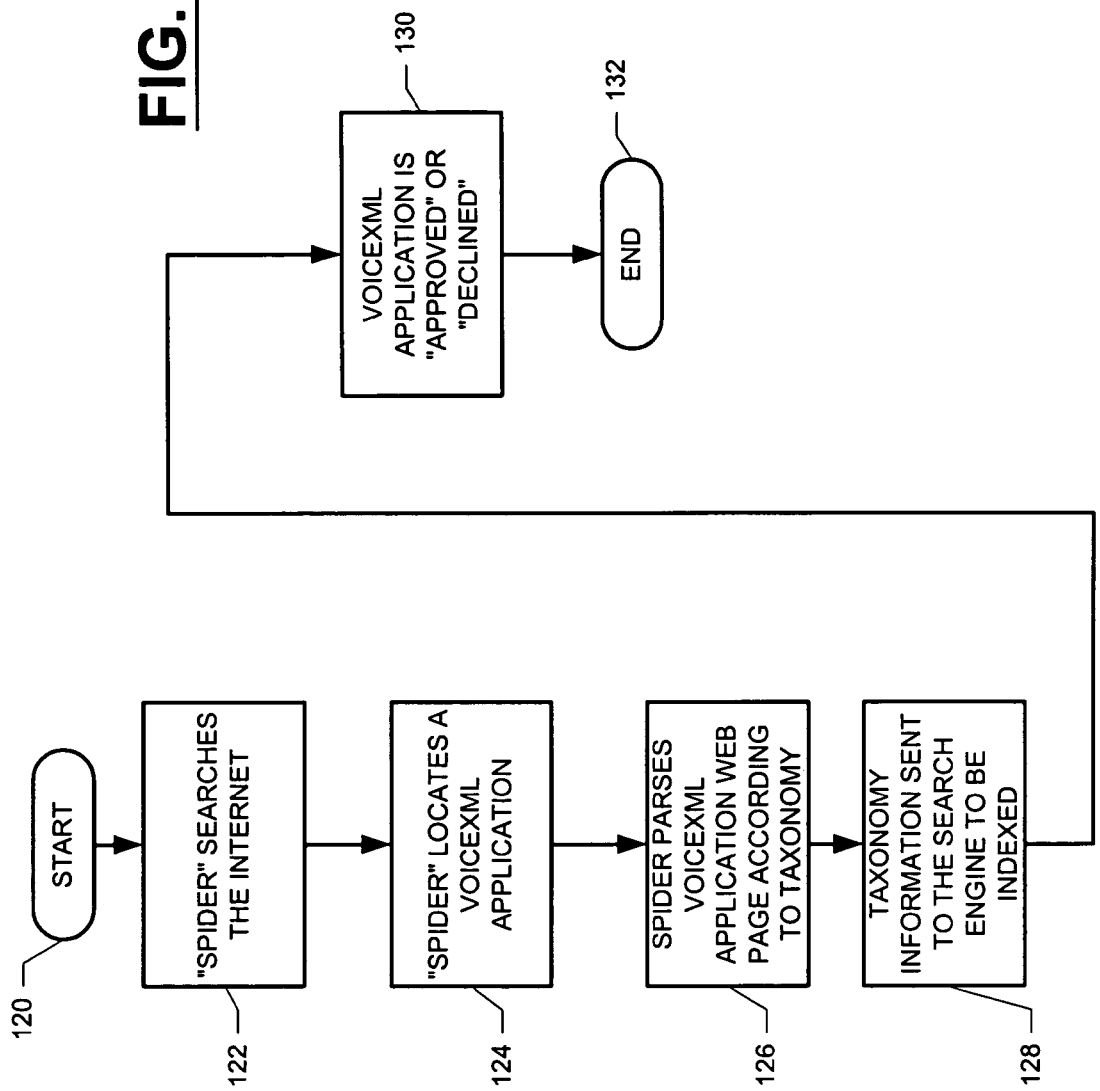

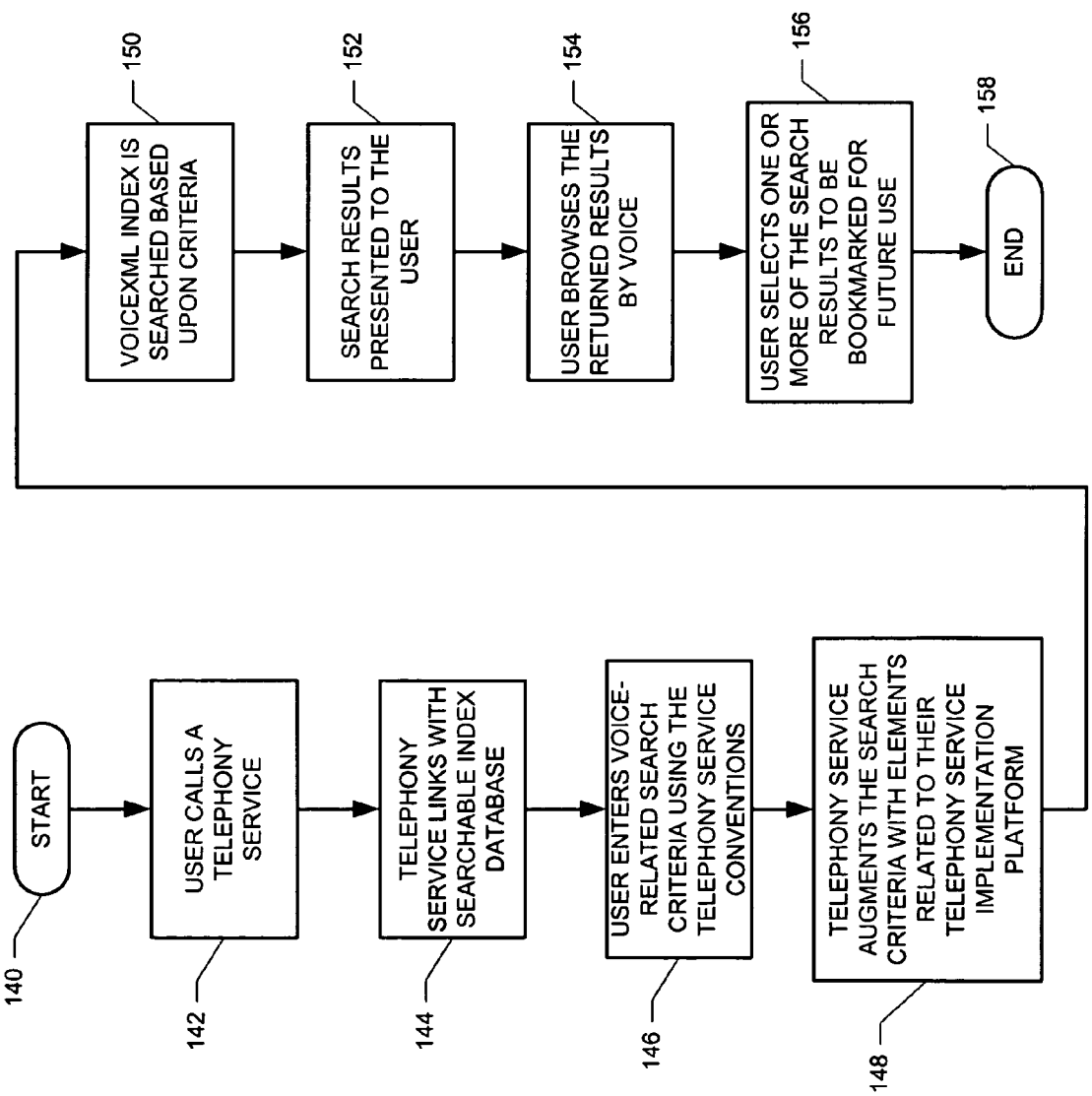

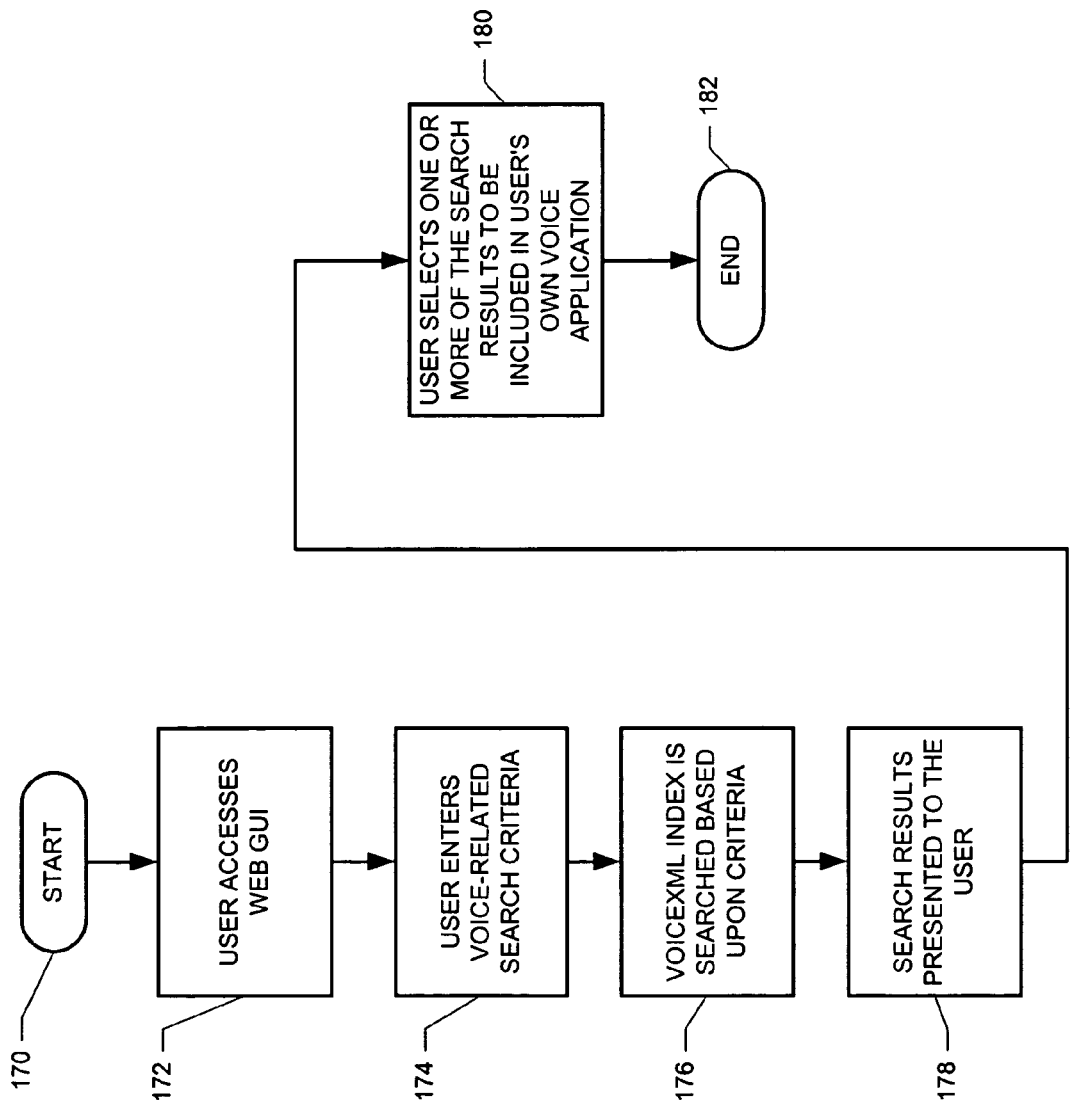

COMPUTER-IMPLEMENTED VOICE
APPLICATION INDEXING WEB SITE

BACKGROUND

1. Technical Field

The present invention is directed to Internet search engines. More specifically, the present invention is directed to Internet voice-related search engines.

2. Description of the Related Art

Presently, the Internet provides users with visually-based interfaces to service applications. Internet users employ keyboards, pointing devices and other such techniques to interact with Internet applications. Internet applications include for example content searching applications as provided by such companies as Yahoo or Infoseek. Other applications include address or phone number lookups.

Telephone users have difficulty in using Internet applications due to their devices not being adept to interacting with the visually-based interfaces of the Internet applications. For example, cell phone users have relatively small displays within which to view Internet information. To mitigate this problem, voice markup languages have been introduced to make available the services of the Internet to telephone users. One such voice markup language is VoiceXML which permits users to interact with Internet web pages using an audio (i.e., telephone) interface.

An example of a VoiceXML application is a restaurant locating application with which a user can communicate in order to locate a restaurant in a certain city. Such interaction includes asking the user questions, such as the type of restaurant and location. Another VoiceXML application may interact with the user to provide directions to the restaurant. VoiceXML applications typically reside on Internet web sites. Telephony servers act as an interface with the web sites and allow the VoiceXML applications to interact with the user.

Telephony servers require a wide range of voice applications as they are driven by the ever varying service needs of their users. However, locating the specific voice application to fulfill a need of their users in real-time is difficult. For example, a voice application to locate restaurants in Chicago may require one type of speech recognition engine, while another voice application to locate restaurants in San Francisco may require another type.

Since the needs are dynamic and must be satisfied in real-time, telephony servers require a mechanism that can quickly locate the correct voice application. Most telephony servers lack such a mechanism and rely upon "hard-wired" solutions where the telephony servers use only a pre-selected number of voice applications whose operational requirements are known beforehand. Limiting the pool of voice applications to a certain pre-selected number is an undesirable trait of the current telephony approaches.

SUMMARY

The present invention solves the aforementioned disadvantages as well as other disadvantages of current telephony approaches. In accordance with the teachings of the present invention, a computer-implemented voice application indexing method and system provide voice applications that supply telephony services to users. The method and system include receiving voice application data over the network regarding the voice applications. The voice application data contains location data that indicate where the voice applications are located on the network. The voice application data are stored in a database in accordance with a predetermined voice application taxonomy. A request is received for a voice application based upon a user requesting a telephony service. The request includes search criteria for selecting a voice application from the database. The location data of at least one voice application (whose stored voice application information substantially satisfies the search criteria) is retrieved from the database. The voice application located at the retrieved location data is used to perform the user-requested telephony service.

BRIEF DESCRIPTION OF THE DRAWINGS

FIG. 7 is a flowchart depicting the process steps to automatically search for remote Internet voice markup language applications;

FIG. 8 is a flowchart depicting the process steps to perform a search within a wireless communication device context; and FIG. 9 is a flowchart depicting the process steps to perform a search within a web graphical user interface context.

DETAILED DESCRIPTION OF THE PREFERRED EMBODIMENT

Figure 1:
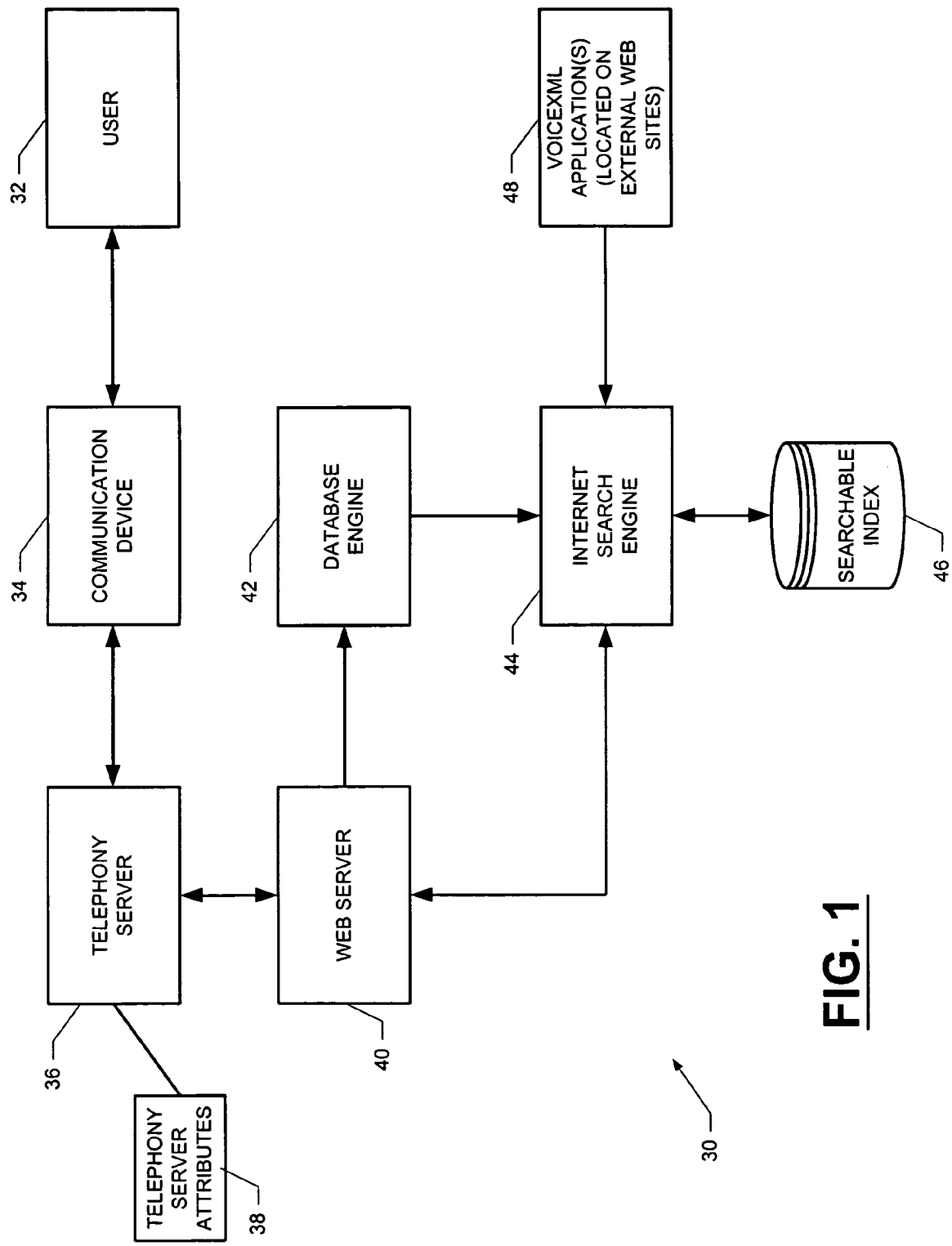
FIG. 1 is a system diagram depicting computer-related components of the present invention as used within a telephony server context.

FIG. 1 is a system block diagram that generally shows at 30 the computer-implemented components of the present invention. The present invention indexes and catalogues voice computer applications, such as VoiceXML applications. The voice applications are able to be searched using the index and linked into a user's telephony server. Once linked, the user has access via a wireless communication device to the services provided by the voice applications.

With reference to FIG. 1, a user 32 utilizes a communication device 34 to access the user's telephony server 36. The present invention may be utilized by many different types of communication devices, such as a cellular communication device. The present invention also may be used by any communication device that can access a telephony server, such as a regular telephone.

The user 32 may be utilizing the communication device 34 to have a service performed. An example of a service includes the telephony server 36 receiving a call from the user 32 so that the user 32 may locate a restaurant in a certain city. The telephony server 36 uses a web server 40 to access a restaurant-locating voice application 48 that is on a network, such as the Internet. The voice application 48 may be a VoiceXML application located on a remote web site. Another exemplary voice application includes the user 32 calling to locate the phone number of another individual.

The telephony server 36 determines that a service is needed in order to process the request from the user 32. The telephony server 36 communicates to the web server 40 the characteristics of the needed service. The web server 40 uses the present invention to locate a voice application 48 that can provide the needed service.

The web server 40 communicates to a database engine 42 the characteristics of the needed service. The database engine 42 uses an Internet search engine 44 to search a voice application index database 46. The database 46 contains an index of voice applications that have been catalogued according to a taxonomy of the present invention. For example, the taxonomy includes indexing voice applications based upon what resources are required to operate each voice application.

The database engine 42 formulates search criteria to locate voice applications that can provide the needed service. The search criteria is formulated based upon the characteristics of the needed service. The characteristics include what type of application is needed, such as whether the telephony server needs a restaurant-locating voice application or some other voice application type. The search criteria also includes telephony server attributes 38. Telephony server attributes 38 describe the operating characteristics of the telephony server 36, such as what speech engines are able to operate on the telephony server.

The Internet search engine 44 uses the search criteria to determine which voice applications are suitable to fulfill the telephony server's request. When the location of at least one suitable voice application has been identified, the Internet search engine 44 retrieves the suitable voice application 48 over the Internet. The Internet search engine 44 then provides the voice application 48 to the telephony server 36 via the web server 40. The telephony server 36 performs the functions of the voice application 48 in order to satisfy the request of the user 32.

Figure 2:
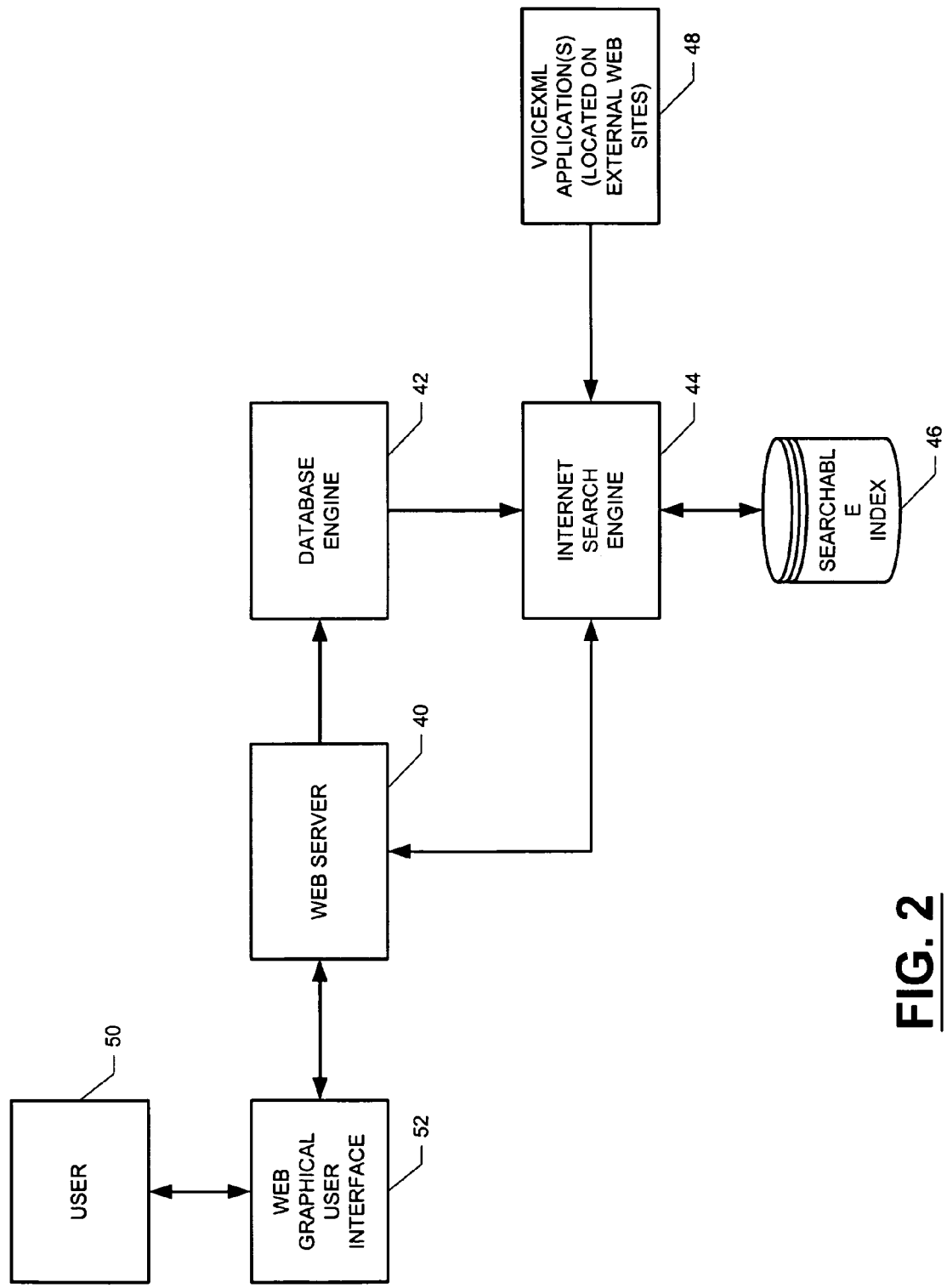
FIG. 2 is a system diagram depicting computer-related components of the present invention as used within a web graphical user interface context.

FIG. 2 depicts the use of a web graphical user interface 52 for a user 50 to enter voice application data into the data structure of the present invention. The interface 52 provides data entry regions for the user 50 to complete. The interface 52 follows the taxonomy of the present invention so that voice applications can be properly indexed. For example, the interface 52 obtains from the user 50 what resources a voice application requires. Exemplary resource requirements include what speech recognition engines and/or text-to-speech engines are required by the voice application.

Voice application licensing data may also be collected by the interface 52. For example, the telephony server may have to pay a set amount for each use of a remote voice application. A voice application's compliance with a voice markup language standard may be collected by the interface 52. The compliance data may specify which voice markup language and version of the language are being used by the voice application. Other information supplied by the user includes the location and description of the voice application. The interface 52 provides a list of categories from which the user 50 may select in order to classify the voice application. The interface 52 provides the collected information to the Internet search engine 44 which stores it in the index database 46 in accordance with the taxonomy of the present invention.

The interface 52 provides further features that allow users to browse voice application web sites and information, to search for voice application sites based upon a set of criteria, and to collect resultant Uniform Resource Locators (URLs) and to make later use of them in their own voice browsers. Voice browsers allow users to manage and navigate within one or more VoiceXML applications.

Figure 3:
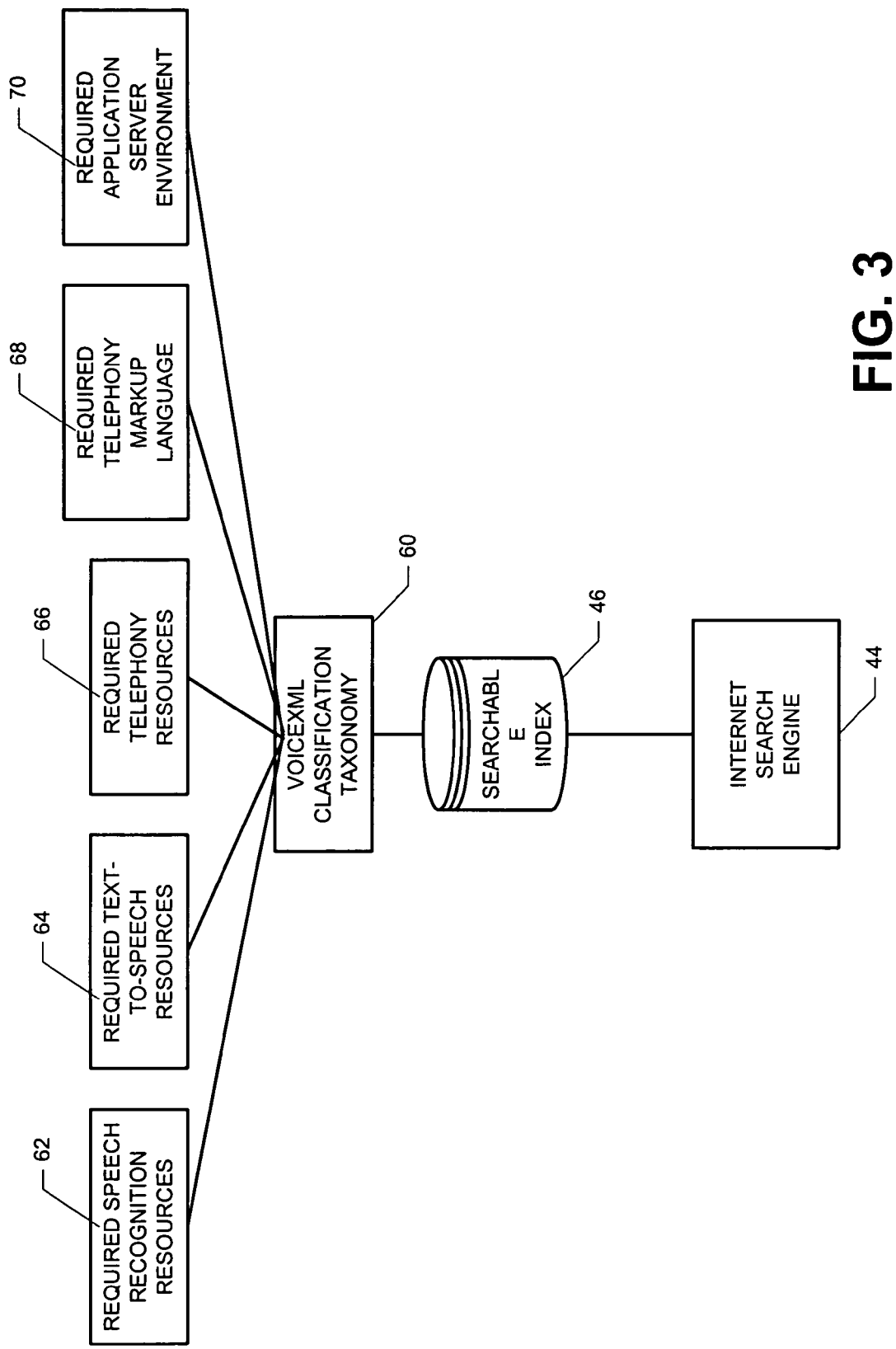
FIG. 3 is a data structure diagram depicting the schema of the searchable index database.

FIG. 3 is a data structure diagram depicting the schema of the searchable index database 46. The index database 46 is structured according to a taxonomy 60 that classifies voice applications. The taxonomy 60 includes: a data structure 62 to store information about speech recognition resources required by the voice applications; a data structure 64 to store information about text-to-speech resources required by the voice applications; a data store 66 to store telephony resources required by the voice applications; a data structure 68 to store the version of the markup languages used by the voice applications; and a data structure 70 to store the application server environment information and licensing information of the voice applications. The schema of the index database 46 may be implemented in a relational database. However, it should be understood that the present invention is not limited to a relational database environment, but includes computer information storage schemes that permit the storage and retrieval of the voice application classification data.

Figure 4:
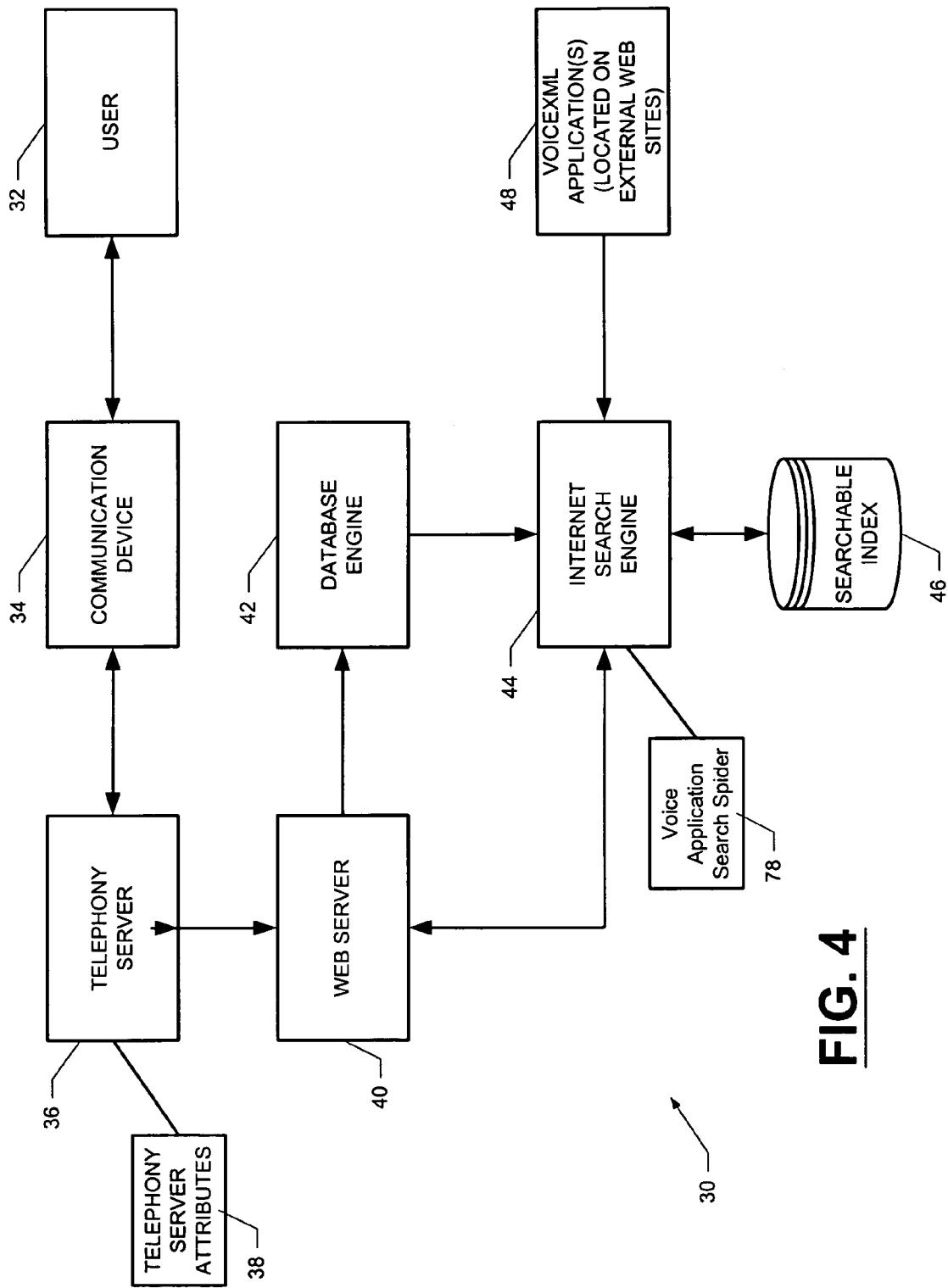
FIG. 4 is a system diagram depicting automated voice application indexing performed by the present invention.

FIG. 4 is a system diagram depicting automated voice application indexing as performed by the present invention. Automated indexing may be used exclusively or in parallel with a web interface to collect voice application data. Automated indexing may also be performed when a voice application cannot be located within the index database 46 that can perform the service requested by the telephony server 36. In such a situation, the Internet search engine 44 creates an automated Internet voice application search spider 78 to locate an appropriate voice application on the Internet. Moreover, if a voice application cannot be located within the index database 46, then the present invention posts on its web server 40 that such a voice application is needed. Voice application developers may then generate voice applications after seeing the posted notice or receiving an electronic mail message from the present invention that such a voice application is needed. The posted notice on the web server's voice application web page and the electronic mail message contain the technical requirements for the desired voice application, such as the attributes 38 of the telephony server 36 that requested the voice application.

Figure 5:
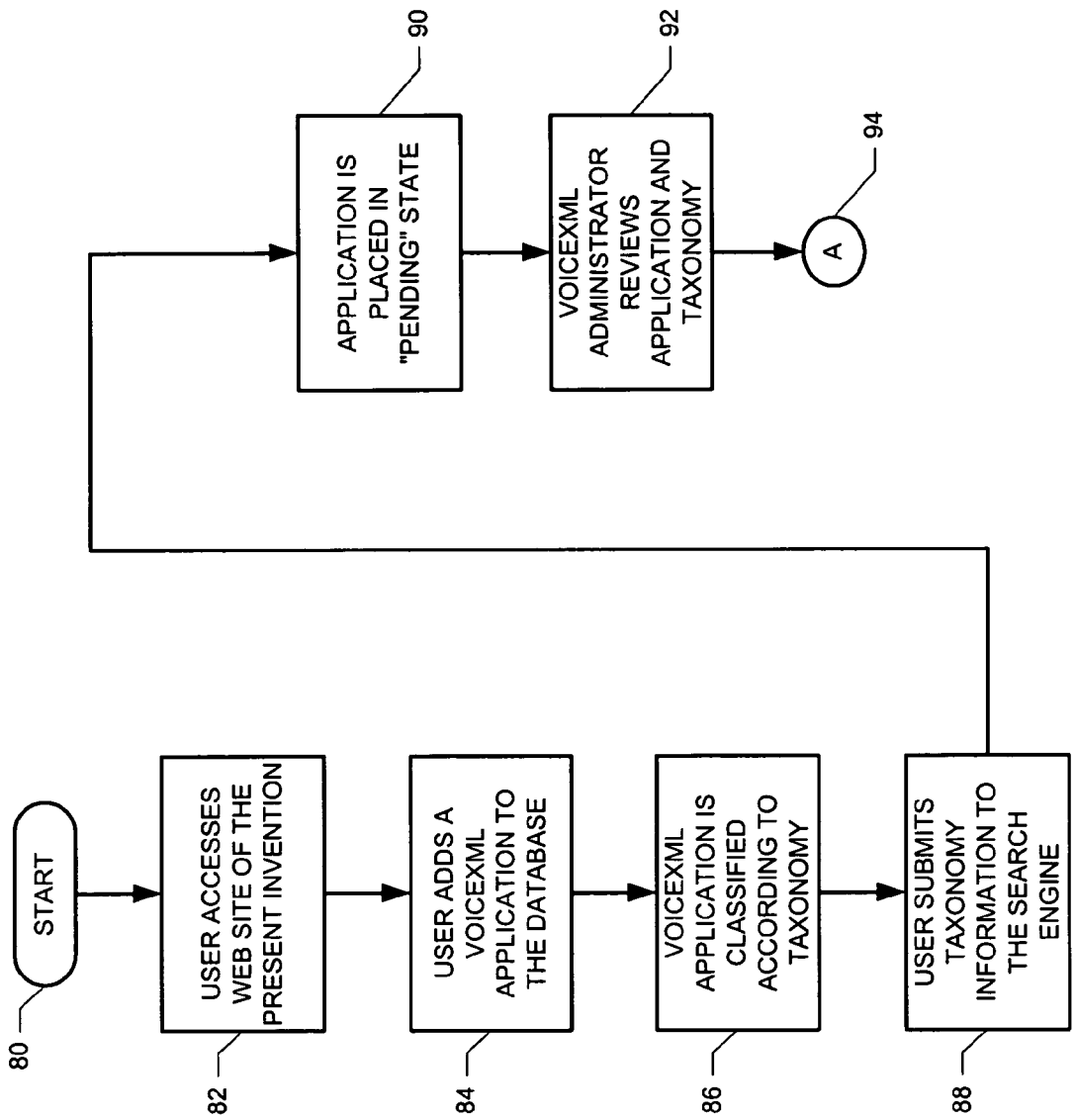
FIGS. 5 and 6 are flowcharts depicting the process steps to index a voice markup language application.
Figure 6:
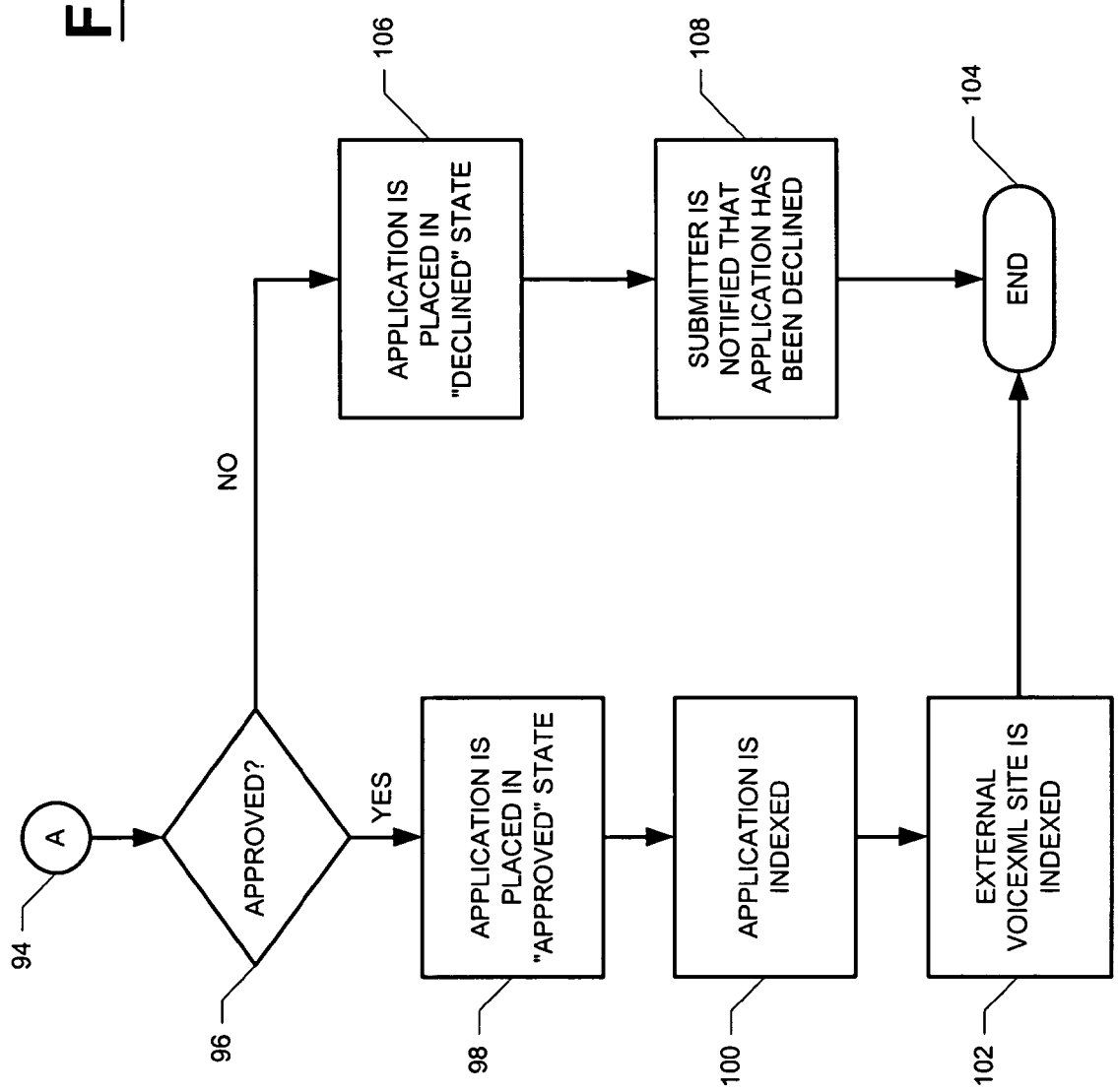

FIGS. 5 and 6 are flowcharts depicting the process steps to index a voice markup language application. With reference to FIG. 5, start indication block 80 indicates that process block 82 is performed wherein a user accesses the web site of the present invention. At process block 84, the user provides information about a voice application to the present invention.

Process block 86 classifies the voice application data in accordance with the taxonomy scheme of the present invention. Process block 88 submits the taxonomy information to the search engine which places the voice application in a "pending state" at process block 90. The voice application remains in a "pending" state until it is approved by a voice application web site administrator. At process block 92, the administrator reviews the voice application information to verify that the voice application exists at the specified location and operates in accordance with the classification information provided by the user. Continuation block 94 indicates that processing continues at decision block 96 on FIG. 6.

With reference to FIG. 6, decision block 96 determines whether the voice application should be approved based upon the review by the administrator. If the voice application is approved for use by telephony servers, then process block 98 updates the index database to indicate that the voice application is in an "approved" state. Process blocks 100 and 102 respectively allow the voice application and its external web site to be formally indexed within the database. Processing terminates at end block 104.

If the voice application is not approved at decision block 96, then process block 106 updates the index database to indicate that the voice application is in a "declined" state. Process block 108 notifies the voice application submitter that the application has been declined. Processing terminates at end block 104.

FIG. 7 is a flowchart depicting the process steps to automatically search for remote Internet voice markup language applications. Start indication block 120 indicates that process block 122 is performed wherein the present invention creates and sends out on the Internet a spider to search for voice applications.

At process block 124, the spider locates a voice application and parses at process block 126 the voice application in accordance with the taxonomy of the present invention. Preferably, the spider parses the metatags of the voice application in order to extract such exemplary taxonomy information as description and voice markup language version data.

Process block 128 sends the taxonomy information to the search engine in order to be indexed. The voice application is approved or declined based upon review by the administrator at process block 130. If the voice application is approved, then the voice application is made available to telephony servers and the web community. Processing terminates at end block 132.

FIG. 8 is a flowchart depicting the process steps to perform a voice application search within a wireless communication device context. Start indication block 140 indicates that process block 142 is performed wherein a user calls a telephony server in order to request a service. At process block 144, the telephony service links to the searchable index database of the present invention in order to locate a voice application to perform the service. Criteria to search the database is provided by the user at process block 146. At process block 148, the telephony service augments the search criteria with information related to the telephony server implementation platform.

Process block 150 uses to the criteria to search the voice application index database. Process block 152 returns the voice application to the telephony service so that the voice application can perform the requested service. The present invention also allows the user to browse at process block 154 the voice application search results and to select which of the returned voice applications to use. Process block 156 allows the user to bookmark voice applications that the user wishes to use in the future.

FIG. 9 is a flowchart depicting the process steps to perform a search within a web graphical user interface context. Start indication block 170 indicates that process block 172 is performed wherein a user accesses the web graphical user interface (GUI) of the present invention. At process block 174, the user enters voice-related search criteria through the interface.

Process block 176 searches the voice application index of the present invention based upon the criteria specified by the user. The search results are presented to the user at process block 178. The user selects at process block 180 one or more of the search results to be included in the user's own telephony server application. Processing terminates at end block 182.

The preferred embodiment described with reference to the drawing figures is presented only to demonstrate an example of the invention. Additional and/or alternative embodiments of the invention will be apparent to one of ordinary skill in the art upon reading this disclosure.

It is claimed:

1. A computer-implemented voice application indexing method for supplying voice applications that provide telephony services to users, comprising the steps of:

receiving voice application data over an Internet network, wherein the voice application data includes location data to indicate where the voice applications are located on a remote Web site on the Internet network;

storing in a database the voice application data in accordance with a predetermined voice application taxonomy, wherein the taxonomy includes at least indexing voice applications based upon what resources are required to operate each voice application and type of telephony service provided;

receiving a request for a voice application based upon a user requiring a telephony service, wherein the request includes at least search criteria for selecting a voice application from the application data stored in the database including resources required for operation in the request and type of telephony service required by the user; and retrieving from the database the location data of at least one voice application whose stored voice application data substantially satisfies the search criteria;

wherein the voice application located at the retrieved location from the data is used to perform the user-requested telephony service.

2. The method of claim 1 wherein the voice application data includes voice application operational requirement data, said method further comprising the steps of:

receiving from a telephony server telephony server attribute data, wherein the telephony server is an interface between the user and the database; and retrieving from the database the location data of at least one voice application whose voice application operational requirement data substantially satisfies the telephony server attribute data.

3. The method of claim 1 wherein the voice application data includes voice markup language data which indicates type of voice markup language used in the voice applications, said method further comprising the step of:

retrieving from the database the location data of at least one voice application whose voice markup language data substantially satisfies the search criteria.

4. The method of claim 1 wherein the voice application data includes speech engine requirement data, said method further comprising the steps of:

receiving from a telephony server telephony server attribute data which indicates which speech engines are operational within the telephony server; and retrieving from the database the location data of at least one voice application whose speech engine requirement data substantially satisfies the telephony server attribute data.

5. The method of claim 1 wherein the voice applications are VoiceXML applications.

6. The method of claim 1 wherein the location data is a Uniform Resource Locator (URL) of the remote Web site which indicates where the voice applications are located on the Internet network.

7. The method of claim 1 wherein the database is a relational database.

8. The method of claim 1 wherein the voice application taxonomy includes classifications selected from the group consisting of required speech engine resources, required telephony resources, required telephony markup language, required application server environment, and combinations thereof.

9. The method of claim 1 further comprising the step of:
   receiving the request for a voice application through a telephony server that is connected to the user.

10. The method of claim 1 wherein the search criteria includes the nature of the telephony service requested by the user.

11. The method of claim 1 further comprising the step of:
   providing the voice application data through a graphical user interface that is in data communication with the Internet network.

12. The method of claim 11 wherein the graphical user interface allows retrieving location data of at least one of the voice applications based upon criteria specified through the graphical user interface.

13. The method of claim 1 further comprising the step of:
   reviewing the voice application data to ensure accuracy of the voice application data.

14. The method of claim 13 further comprising the step of:
   reviewing the voice application data to verify the location data of the voice applications on the Internet network.

15. The method of claim 13 further comprising the step of:
   reviewing the voice application data to verify that the operation of the voice applications complies with the voice application data.

16. The method of claim 1 further comprising the step of:
   sending on the Internet network an automated searching spider to locate and index additional voice applications that are located on the network.

17. The method of claim 16 wherein the spider is sent when a search of the database does not retrieve based upon the search criteria any location data for the voice applications.

18. A computer-implemented voice application indexing system for supplying voice applications that provide telephony services to users, comprising:
   a voice application data structure that contains voice application data that is received over an Internet network and regards the voice applications, wherein the voice application data includes location data to indicate where the voice applications are located on the Internet network;
   a database that stores the received voice application data in accordance with a predetermined voice application taxonomy, wherein the taxonomy includes at least indexing voice applications based upon what resources are required to operate each voice application and type of telephony service provided;
   a database engine with a data connection to the database, wherein the database engine receives a request for a voice application the request including search criteria including user resources for operating applications and requiring a specific telephony service;
   wherein the database engine retrieves from the database the location data of at least one voice application on a remote Web site whose stored voice application data substantially satisfies the search criteria;
   whereby the voice application located at the retrieved location data is used to perform the user-requested telephony service.

19. The voice application indexing system of claim 18 wherein the voice application data includes voice application operational requirement data, wherein a telephony server provides telephony server attribute data to the database engine, wherein the database engine determines the location data of at least one voice application whose voice application operational requirement data substantially satisfies the telephony server attribute data.

20. The voice application indexing system of claim 18 wherein the voice application data includes voice markup language data which indicates type of voice markup language used in the voice applications, wherein the database engine retrieves from the database the location data of at least one voice application whose voice markup language data substantially satisfies the search criteria.

21. The voice application indexing system of claim 18 wherein the voice application data includes speech engine requirement data, wherein the database engine receives from a telephony server telephony server attribute data which indicates which speech engines are operational within the telephony server, wherein the database engine retrieves from the database the location data of at least one voice application whose speech engine requirement data substantially satisfies the telephony server attribute data.

22. The voice application indexing system of claim 18 wherein the voice applications are VoiceXML applications.

23. The voice application indexing system of claim 18 wherein the location data is a Uniform Resource Locator (URL) of the remote Web site which indicates where the voice applications are located on the Internet network.

24. The voice application indexing system of claim 18 wherein the database is a relational database.

25. The voice application indexing system of claim 18 wherein the voice application taxonomy includes classifications selected from the group consisting of required speech engine resources, required telephony resources, required telephony markup language, required application server environment, and combinations thereof.

26. The voice application indexing system of claim 18 wherein the search criteria includes the nature of the telephony service requested by the user.

27. The voice application indexing system of claim 18 further comprising:
   a graphical user interface with a data connection over the Internet network to the database for providing the voice application data.

28. The voice application indexing system of claim 27 wherein the graphical user interface allows retrieval of location data of at least one of the voice applications based upon criteria specified through the graphical user interface.

29. The voice application indexing system of claim 18 further comprising:
   automated searching means for locating and indexing additional voice applications that are located on the Internet network.

30. The voice application indexing system of claim 29 wherein the automated searching means is provided when a search of the database does not retrieve based upon the search criteria any location data for the voice applications.

* * * * *